United States Patent [19]

Esrom

[11] Patent Number: 4,522,898

[45] Date of Patent: Jun. 11, 1985

[54] HIGH-TEMPERATURE STORAGE BATTERY

[75] Inventor: Hilmar Esrom, Bammental, Fed. Rep. of Germany

[73] Assignee: Brown, Boveri & Cie AG, Mannheim, Fed. Rep. of Germany

[21] Appl. No.: 563,023

[22] Filed: Dec. 19, 1983

[30] Foreign Application Priority Data

Dec. 24, 1982 [DE] Fed. Rep. of Germany ....... 3247969

[51] Int. Cl.³ ............................................ H01M 2/00
[52] U.S. Cl. .................................................. 429/120
[58] Field of Search ..................... 429/120, 26, 71, 72, 429/73, 88

[56] References Cited

U.S. PATENT DOCUMENTS

| 3,745,048 | 7/1973 | Dinkler et al. ..................... 429/120 |
| 3,837,918 | 9/1974 | Nakabayashi .................. 429/120 X |
| 4,107,402 | 8/1978 | Dougherty et al. ................ 429/120 |
| 4,443,523 | 4/1984 | Hasenauer ...................... 429/120 X |
| 4,443,524 | 4/1984 | Meinhold et al. ............. 429/120 X |

Primary Examiner—Anthony Skapars
Attorney, Agent, or Firm—Herbert L. Lerner; Laurence A. Greenberg

[57] ABSTRACT

High-temperature storage battery with a double-walled housing with insulating material arranged between the housing walls and the interior of the housing, containing at least one storage cell as well as a cooling medium. At least one distributor for feeding the cooling medium to the storage cells is provided in the interior of the housing.

13 Claims, 9 Drawing Figures

4,522,898

HIGH-TEMPERATURE STORAGE BATTERY

BACKGROUND OF THE INVENTION

1. Field of the Invention

The invention relates to a high-temperature storage battery with a double-walled housing with insulating material between the walls, and storage cells as well as a cooling device with a cooling medium in the interior of the housing.

2. Description of the Prior Art

High-temperature storage batteries with electrochemical storage cells based on alkali metal and chalcogen are used at an increasing rate for the electric propulsion of vehicles.

The high-temperature storage batteries with electrochemical storage cells of the alkali metal/chalcogen type which have become known to date operate at a temperature of 350° C. In order to avoid heat losses, particularly in the rest periods of the high-temperature storage batteries, the cells of the batteries are surrounded by thermal insulation. Considerable heat is generated in the chemical reactions carried out in the storage cells during their operation, requiring cooling of the storage cells in order not to exceed and to maintain the above-mentioned temperature of 350° C. over extended periods of time. If a temperature rise within the high-temperature storage battery to values which are substantially above the operating temperature of the storage cells, comes about, damage thereto and in particular to their solid electrolytes, is likely to occur. British Patent No. 1,386,525 discloses a high-temperature storage battery with cooling. This high-temperature storage battery is constructed from a multiplicity of storage cells which are located in an aluminum container. This container is designed with double walls. Insulating material is arranged between the inner and outer boundary wall of the container. The container further has an input and output line for a cooling medium. This can be fed into the interior of the container and conducted around the storage cells, absorbing the heat given off by the storage cells. Subsequently, the cooling medium after cooling the storage cells is removed from the interior to the outside via the discharge.

A disadvantage in this arrangement is that the cooling medium can only be conducted around the storage cells as an entirety. In this arrangement it is not possible to supply each storage cell with the individual amount of cooling air required by it.

SUMMARY OF THE INVENTION

An object of the invention is to provide, with a minimum of structural means, a high-temperature storage battery which assures optimum cooling of all storage cells and provides maximum safety.

With the foregoing and other objects in view, there is provided in accordance with the invention a high-temperature storage battery comprising a double-walled housing with insulating material between the two walls of the housing, at least one storage cell in the interior of the housing as well as a cooling device with a fluid cooling medium, and at least one distributor for feeding the fluid cooling medium to the storage cells in the interior of the housing.

Other features which are considered as characteristic for the invention are set forth in the appended claims.

Although the invention is illustrated and described herein as embodied in high-temperature storage battery, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
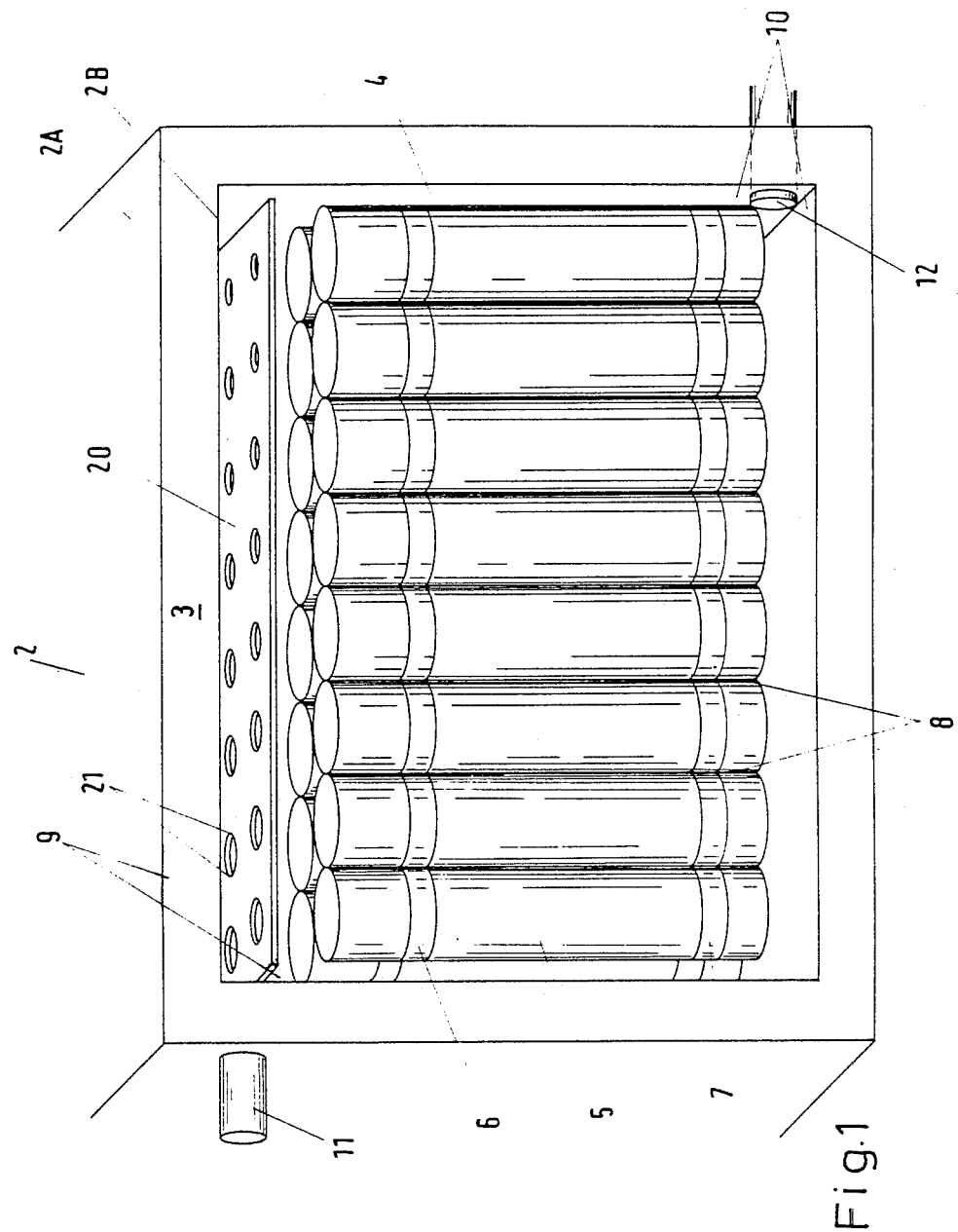
FIG. 1 shows the high-temperature storage battery with a distributor for the cooling medium.

The invention relates to a high-temperature storage battery with electrochemical storage cells of the sodium and sulfur type which are arranged in the interior of a double-walled housing. Insulating material is arranged between the two housing walls. The interior additionally comprises a cooling device with a cooling medium. According to the invention at least one distributor for feeding the cooling medium to the storage cells is provided in the interior. The distributor is preferably designed in the shape of a plate and is provided with openings. The distributor can be arranged above the upper ends or below the lower ends of the storage cells.

According to the invention, the storage cells of the high-temperature storage battery are combined in modules. These modules are arranged in the interior of the housing. Each module has a distributor for the cooling air. The distributors are advantageously designed as plates. The distributor can be arranged either above the upper ends of the storage cells or below the lower ends of the storage cells. If the inlet opening of the cooling medium is arranged in the upper portion of the interior, then the distributor is positioned between the inlet opening and the upper ends of the storage cell at a small distance therefrom. If the distributor is arranged in the lower portion of the interior, it is best to install the same between the lower ends of the storage cells and the discharge opening of the cooling medium.

The storage cells arranged in the modules are mounted self-supporting and are positioned so that at least one empty space remains between each four adjacent storage cells which space extends frpom the upper to the lower end of the storage cells. In one embodiment of the invention, the distributor is provided with openings, through which the cooling medium can be fed to the storage cells. The openings of the distributor are arranged to place the openings above the regions in which the empty spaces between the storage cells are located, to permit the cooling medium to be conducted into these empty spaces via the holes. Preferably, empty spaces are likewise provided between the storage cells and the inner housing wall. In these regions, the respective distributor is likewise provided with openings. A particular guidance of the cooling air into the empty spaces can be achieved through a special design of the opening. For example, the openings on the underside of the distributor may be provided with a flange, causing the entire cooling medium flowing into the opening to be conducted into the empty space and preventing flow along the underside of the distributor. Nozzle-shaped designs on the underside of the opening may also be utilized by means of which the flow velocity of the cooling medium can additionally be determined. The diameters of the openings in a distributor may either be all of the same or of different dimensions. The size of the openings depends on the desired amount of cooling medium to be conducted into the empty spaces. Preferably, the openings in the central region are chosen to be of larger cross-sectional area than the outer openings. This is logical because a larger heat build-up is produced around the storage cells arranged in the center thus, requiring a larger amount of cooling air there. The number of openings and their diameters must be determined either by calculation or experimentally prior to the construction of each high-temperature storage cell. In a further embodiment, the distributor is made in two parts. The two parts are separated from each other by a large empty space, through which a particularly large amount of cooling medium can be fed to the storage cells arranged in the center. In another embodiment, the distributor is designed as a wedge, insulating material being arranged between the upper and lower boundary surface of the wedge. Through the use of such a distributor which is arranged either within a module or, if the high-temperature storage battery has no such subdivision into modules, extends over the entire material, optimum cooling of all storage cells can be achieved. In particular, every storage cell can be cooled so that all storage cells are at the same temperature level. The development of hot spots between the storage cells or the occurrence of a heat build-up is minimized if not eliminated. Air as the preferred cooling medium is pumped into the high-temperature storage battery from outside and the air after cooling the cells can be suctioned off from the battery.

The invention will be explained in the following with reference to the drawings.

The high-temperature storage battery shown in FIG. 1 has a double-walled metallic housing 2. In the embodiment shown here, the latter has the shape of a slab. The outer and the inner housing walls 2A and 2B are made of steel. They are arranged at a predeterminable distance from each other with a space between them which is filled with insulating material 3. In addition, air is evacuated from this space. This space is hermetically sealed to the outside. An oxide-ceramic powder can be used, for instance, as insulating material. The housing 2 has an interior 4 adapted to receive the storage cells 5. The storage cells are arranged in pairs, forming a row. Within the interior 4, several such rows of storage cells are installed. Each row of storage cells is provided with a mount 6 at its upper ends and a mount 7 at their lower ends and is thereby fastened self-supporting at the two ends of the interior 4. The storage cells 5 of each row are connected to each other so that between every two adjacent storage cells, an empty space 8 remains which extends from the upper to the lower end of the storage cells 5. The size of the interior 4 is chosen to provide empty spaces 9 and 10 between the upper and the lower ends of the storage cells and the inner housing walls 2B. The feed line 11 opens into the empty space 9 for the introduction of the cooling medium, by means of which the heat generated by the storage cells 5 is removed. In the embodiment example shown here, air is used as the cooling medium. The feed line 11 is brought through the two housing walls 2A and 2B as well as through the insulating material 3 contained therebetween. An opening of the feedline 11 is in communication with the outer environment of the high-temperature storage battery 1 and can be connected to a cooling air supply. A distributor 20 for the cooling air is provided between the upper ends of the storage cells 5 and the input opening of the cooling medium feedline 11. The distributor 20 is designed as a plate which covers the storage cells and with all its sides resting against the inner housing wall 2B. The distributor 20 is parallel to the upper ends and spaced only a few millimeters from the storage cells. Round openings 21 are provided in the distributor 20 above the regions in which the empty spaces 8 are located which spaces are between the storage cells 5. The openings 21 may have the same or different diameters. By positioning the openings 21 over the empty spaces 8, the cooling air coming from the feedline 11 blows along the distributor 20 and is conducted into the empty spaces 8 via the openings 21. The cooling air entering the empty space 8 flows all around the storage cell from its upper to its lower end cooling the storage cell by the air flow. The effect of the distributor 20 is to cool all the storage cells 5 to about the same temperature level. Due to the arrangement of many storage cells in the space 4 of the high-temperature storage battery 1, a greater build-up of heat may occur around some storage cells because of their position as compared to other storage cells. A larger accumulation of heat is found particularly in storage cells which are positioned further inward. The heat from storage cells 5 which are positioned closer to the inner housing wall 2B is less likely to build-up. An arrangement of openings 21 with different diameters is provided in order that storage cells, around which a large amount of heat builds up, are supplied with a larger amount of cooling air than storage cells which have a lesser amount of heat build-up. The size of the openings 21 as well as the points, at which large or small openings 21 should be placed are determined by calculation before the high-temperature storage battery 1 is constructed.

The cooling air flowing from the upper ends of the storage cells 5 downward enters the empty space 10 between the lower ends of the storage cells 5 and the inner housing wall 2B. From there, the cooling air which has become warm by flowing over cells 5 is discharged from the interior 4 through the exhaust line 12. The exhaust line 12 is arranged at the end of the interior 4 opposite the feedline 11. The exhaust line 12 is preferably in the vicinity of the empty space 10. The exhaust line 12 starting from the interior 4 goes through the two housing walls 2A and 2B as well as the insulating material 3 between them and extends with its other opening into the region outside the the high-temperature storage battery 1.

If the interior is very large and if there are very many rows of storage cells 5, several distributors 20 in the form of such a plate are preferably arranged there. The distributors 20 are installed so that they are arranged in a plane, forming a coherent surface.

According to the invention, the distributor 20 may also be arranged below the lower ends of the storage cells and the exhaust line 12. In this embodiment, the distributor 12 is provided with the openings 21 which are arranged as previously explained.

Positioning the distributor 20 shown in FIG. 1 between the lower ends of the storage cells 5 and the discharge line 12 instead of between the upper ends of the storage cell and the feedline 11 will give the same cooling air distribution to the storage cells 5.

Figure 2:
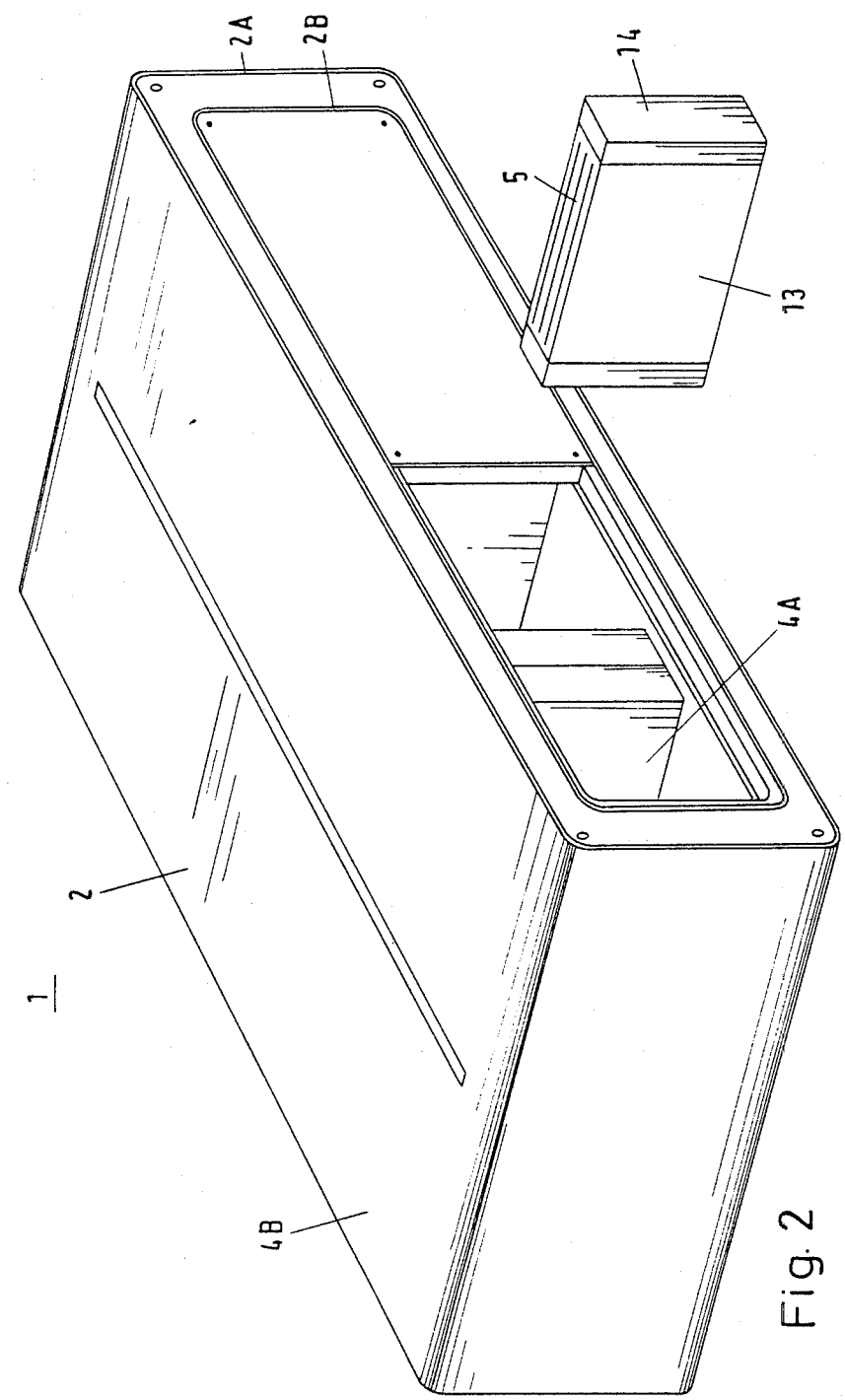
FIG. 2 shows a high-temperature storage battery, in which the storage cells are combined in modules.
Figure 3:
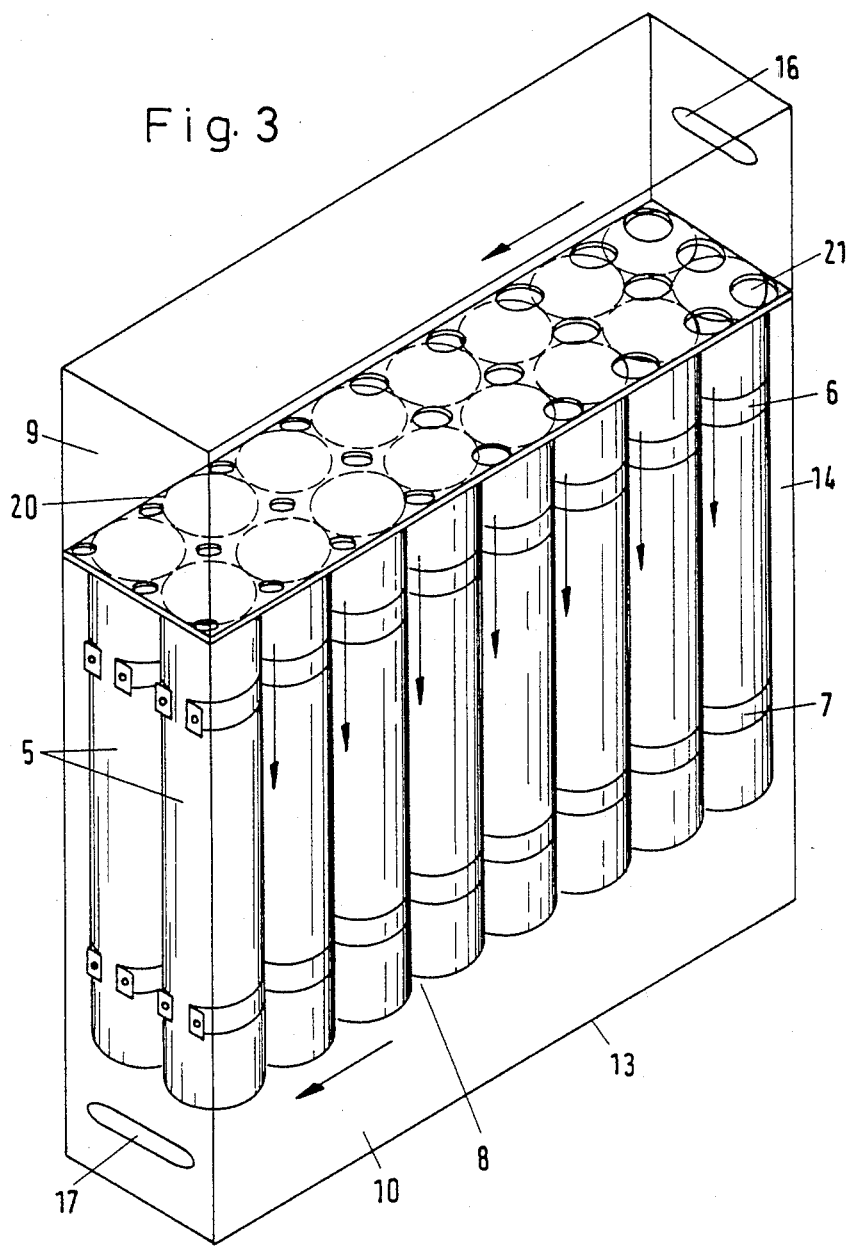
FIG. 3 shows a module with storage cells and a distributor for the cooling medium.

The high-temperature storage battery 1 shown in FIG. 2 is constructed substantially like the one shown in FIG. 1 and explained in the corresponding description. The main difference between the two embodiments of FIG. 1 and FIG. 2 is that in FIG. 2 the interior of the housing is subdivided on both sides of the symmetry axis of the high-temperature storage battery 1 into two regions 4A and 4B into which modules 13 are inserted. In this arrangement the interiors 4A and 4B are made readily accessible even though the lateral boundary surfaces of the high-temperature storage battery 1 are widely separated. Each cavity 4A, 4B can contain 9 modules in the embodiment example shown here. A connection (not shown here) for the cooling air feed and cooling air discharge is provided for each module 13. Each module 13 contains preferably 16 storage cells 5 (not shown here). Each module 13 can be inserted into the high-temperature storage battery 1 independently of the other module 13, and removed independently therefrom. In the high-temperature storage battery shown in FIG. 2, each module 13 is surrounded by a safety enclosure 14 which completely shields it to the outside and in particular, against its adjacent module 13. In such an embodiment of a high-temperature storage battery 1, a distributor 20 for the cooling air is provided in each module 13, as shown in FIG. 3. FIG. 3 shows the embodiment of a module 13 which can be used for the high-temperature storage battery 1 shown in FIG. 2. The module 13 is bounded by a slab-shaped module housing 14. 16 storage cells 5 are arranged in the interior of this module 13. For this purpose, holders 6 and 7 are used to clamp and retain the storage cells 5 in their upper and lower regions. The holders 6 and 7 are connected to the housing 14 at both ends of the module 13. The size of the housing 14 is chosen to leave an empty space 9 and 10 between the housing and the upper ends of the storage cells 5 and the housing and the lower ends of the storage cells 5. Part of the housing 14 can be removed to enable insertion of the storage cells 5 into module 13. This may be accomplished by making one of the narrow lateral boundary surfaces of the module 13 detachable so that the storage cells 5 can be inserted and removed from this side. An input opening 16 for the cooling air is provided in the upper portion at the first end of the module 13. The cooling air is introduced through input opening 16 into the empty space 9 above the upper ends of the storage cells 5. The distributor 20 for the cooling air is disposed between the input opening 16 and the upper end of the storage cells 5. In the embodiment example shown, the distributor 20 is designed as a plate which is parallel to the upper ends of the storage cells 5. The spacing between the distributor 20 and the storage cells is only a few millimeters. The size of the plate which forms the distributor 20 is made so that it covers all storage cells 5 and that it adjoins the housing 14 flush at its outer edges. The plate 20 is preferably fastened to the housing 14. To this end, the plate 20 is connected to the housing 14 at least at two points.

The distributor used here and, in particular, the plate 20 forming it, has openings 21 via which the cooling air can be fed to the storage cells 5. Due to the above-described arrangement of the storage cells 5 in two rows which are arranged side by side, an empty space 8 remains between every 4 adjacent storage cells. Further empty spaces 8 are formed between every two storage cells 5 and the housing 14. The openings 21 are now positioned so that at least one such opening 21 is arranged over each empty space 8. The empty spaces 8 formed between adjoining storage cells 5 or between adjoining storage cells and the housing 14 extend from the upper to the lower end of the storage cells 5, where they lead into the empty space 10. These empty spaces 8 serve as ducts, along which the cooling air is conducted. The diameters of the openings 21 are made in accordance with the amount of cooling air which is to be fed to the individual empty spaces 8. The heat given off by the storage cells 5 is removed more rapidly in the region located between the storage cells 5 and the housing 14, while the heat between the rows of storage cells is removed much more slowly. To keep all storage cells at the same temperature level sufficient cooling air must be fed into each empty space 8 to remove the excess heat. The amount of cooling air required for each empty space 8 can be regulated by an appropriate choice of the respective opening diameter. These values may be determined by calculation or experimentally before the high-temperature battery is built. The cooling air flows through the empty spaces 8 and absorbs the heat given off by the storage cells 5. At the lower end of the storage cells 5, the cooling air flows into the empty space 10 which is located between the lower end of the storage cells 5 and the bottom of the housing 14. A discharge opening 17 is located in the vicinity of the empty space 10 at the second end of the module 13 which is opposite the input opening for the cooling air. The cooling air collected in the empty space 10 is removed from the module 13 through this discharge opening 17. If desired, the distributor 20 can be arranged below the storage cells 5.

Figure 7:
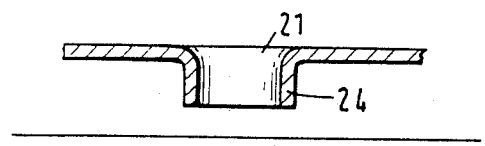
FIGS. 7, 8 and 9 show different embodiments of the distributor openings.
Figure 8:
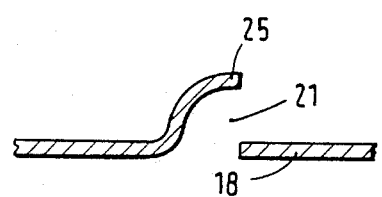
Figure 9:
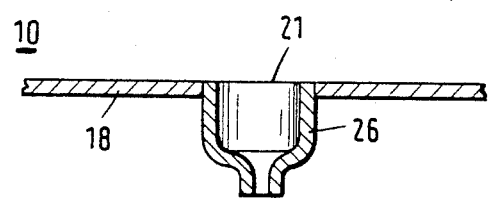

In the embodiment example shown here, the openings 21 of the distributor 20 are shown as round holes. However, openings 21 of different shapes may be utilized. In FIGS. 7 to 9 and in the corresponding description, further embodiments of openings are described.

Figure 4:
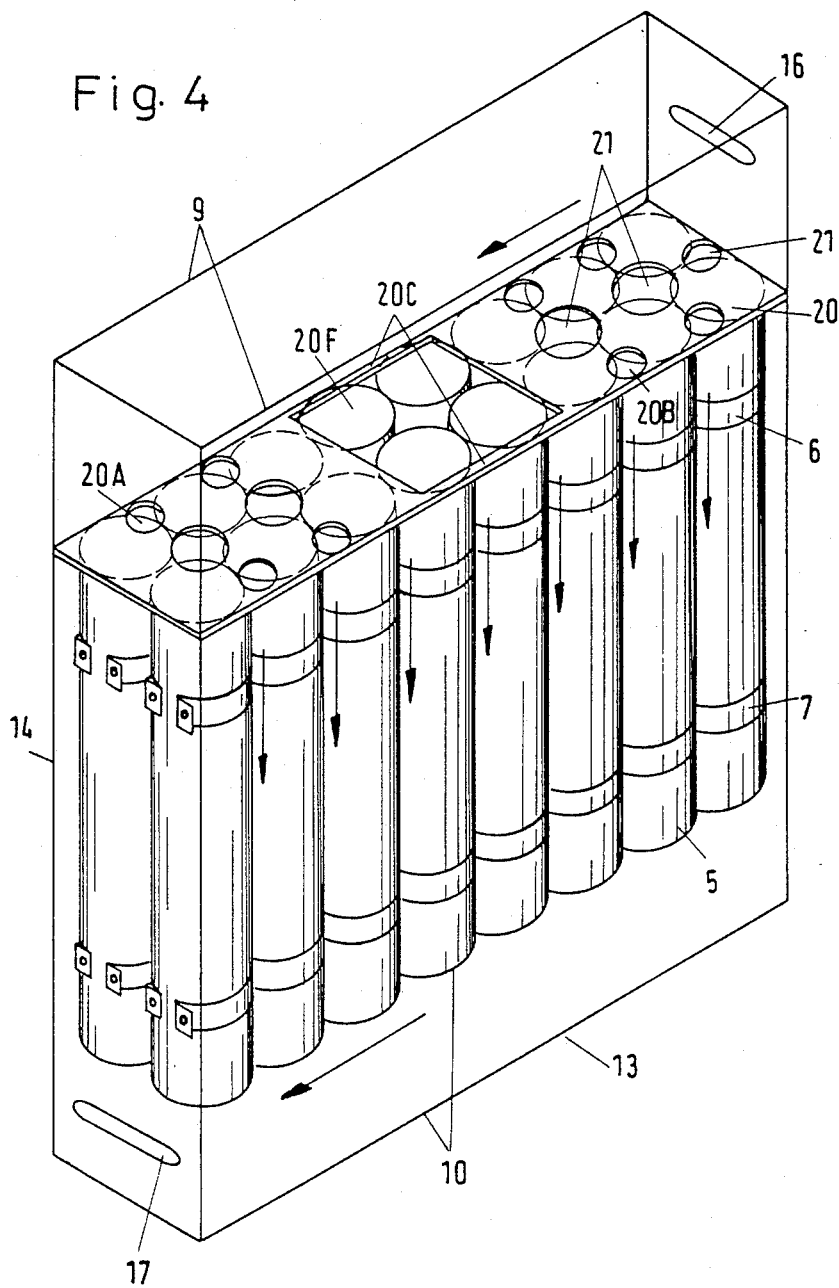
FIG. 4 is a variant of the module shown in FIG. 3.

FIG. 4 shows a further embodiment of a module 13. The latter is designed substantially like the module 13 shown in FIG. 3 and explained in the corresponding description. The essential difference between both is the design of the distributor 20. In the embodiment example shown here, the distributor formed by two plate sections 20A and 20B is arranged between the input opening 16 for the cooling air and the upper ends of the storage cells 5. The plate section 20A is connected to the housing 14 in such manner that it follows flush on the first end of the module and its lateral edges rest likewise against the housing 14. The second plate section 20B follows at the second end of the module and likewise its lateral edges border on the housing 14. The dimensions of the two plate sections 20A and 20B are made so that a space 20F remains between them. In their lateral edge regions, the two plate sections 20A and 20B are firmly connected to each other via a bridge 20C each. Each plate section 20A and 20B is provided with openings 21, through which the cooling air can be fed to the storage cells 5 underneath. The diameters of the openings 21 can be the same or different sizes and be matched to the respective demand for cooling air in the empty spaces 8 underneath between the storage cells 5. With the distributor 20 used here, a substantially larger amount of cooling air can be fed to the storage cells 5 arranged in the central region. This is particularly advantageous because a particularly large heat build-up occurs between these storage cells 5.

Figure 5:
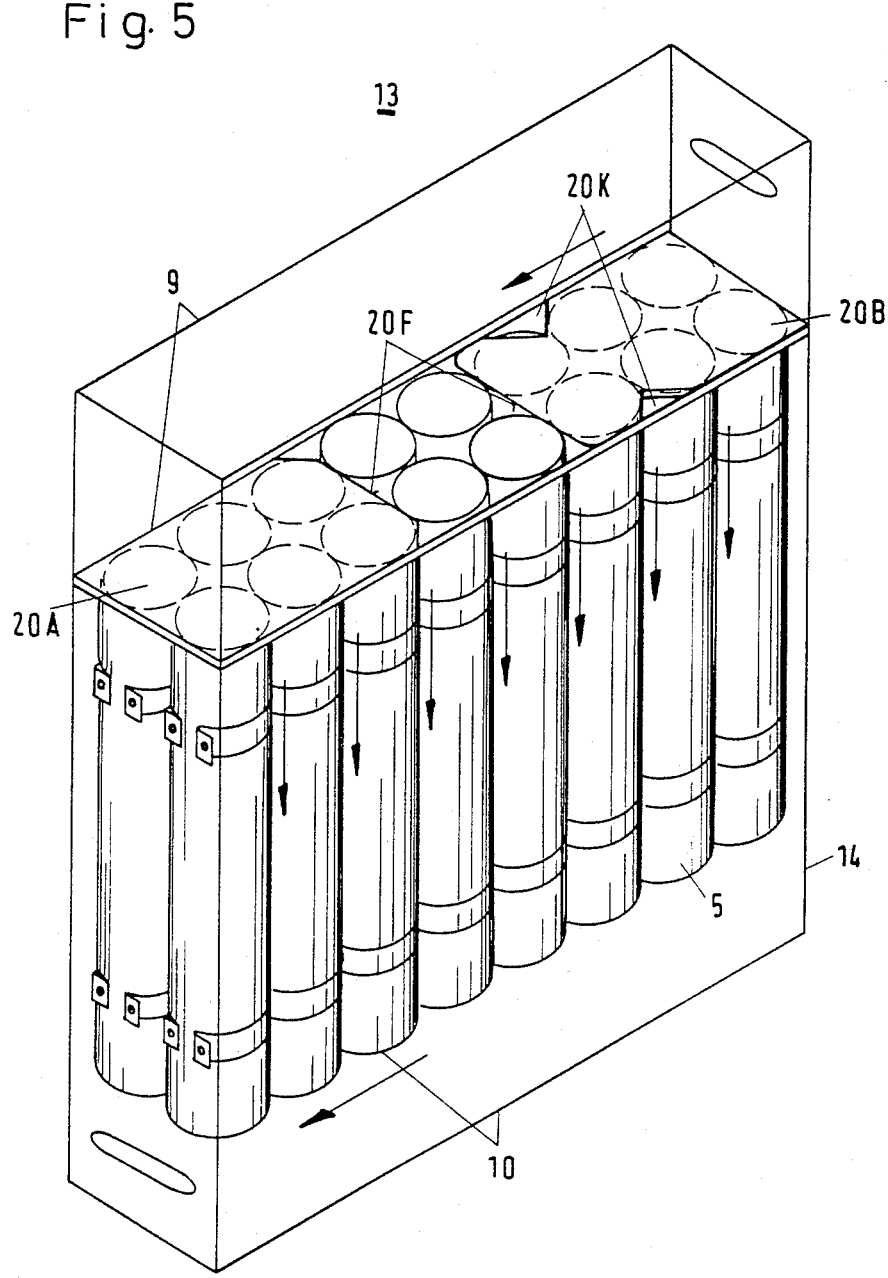
FIG. 5 is a further embodiment of the module with a distributor.

In FIG. 5, a further module 13 is shown which is designed like the module shown in FIG. 3. The essential difference between the two modules 13 is the design of the distributor 20. The distributor 20 used here consists of two plate sections which are arranged in a parallel plane above the storage cells 5 and below the input opening 16 for the cooling air. The dimensions of these two plate sections 20A and 20B are chosen so that here also, the central region is left free, such that the cooling air can flow here directly against the upper ends of the storage cells 5.

The plate section 20A is furthermore designed so that it adjoins the housing 14 flush with its other edges. No openings for the passage of the cooling air are provided in this plate. The same applies to the plate section 20B which likewise adjoins the housing 14 flush with its edges. Plate section 20B deviating from the design of the plate section 20A, has a wedge-shaped cut 20K in its lateral edge regions. Through these wedge-shaped cuts, the cooling air can flow into the empty spaces 8 between the storage cells. The largest amount of cooling air however flows through the empty space 20F located between the two plate sections 20A and 20B, and then down between the storage cells 5.

Figure 6:
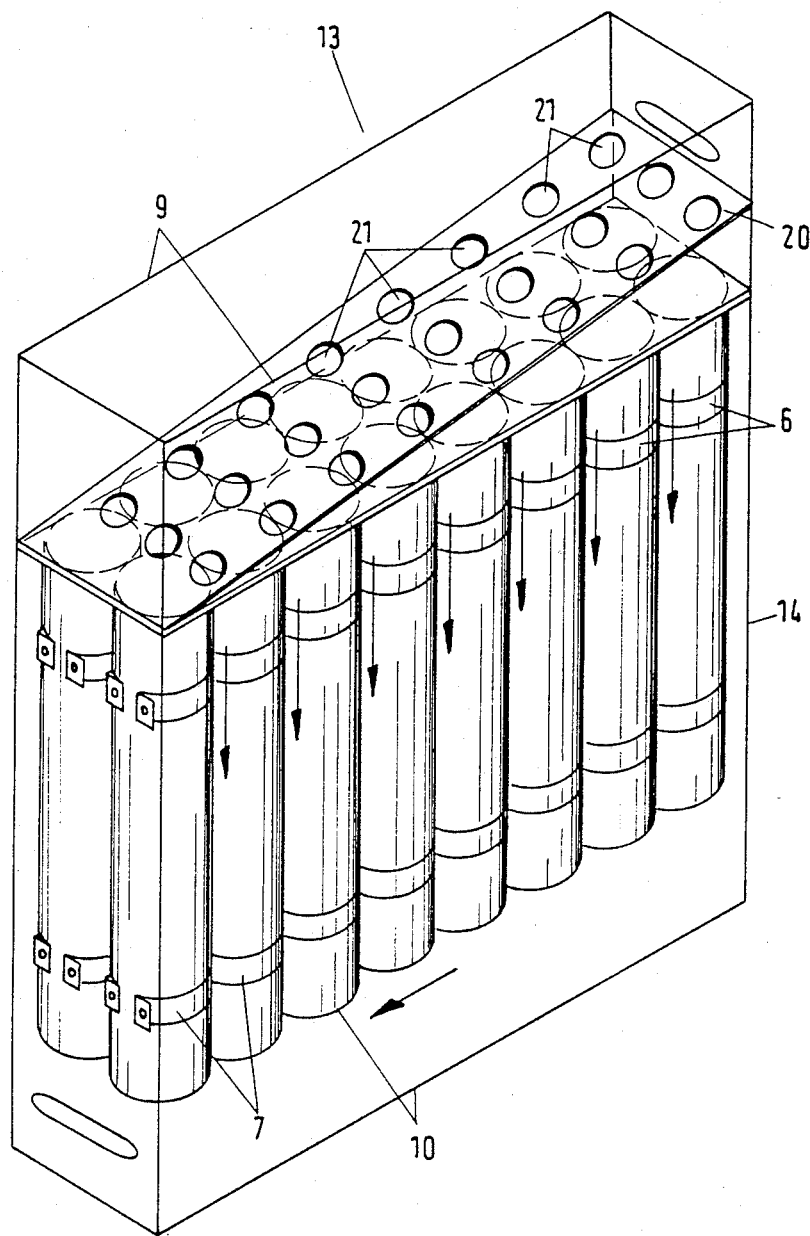
FIG. 6 is a module with a wedge-shaped distributor.

FIG. 6 shows a further variant of a module 13. The distributor 20 is designed here as a wedge. The latter is arranged with its plane surface at a small distance above the upper ends of the storage cells 5. The inclined plane of the distributor 20 is arranged pointing upward. The thicker part of the distributor 20 is installed in the vicinity of the input opening 16. The dimensions of the wedge are chosen so that it adjoins the housing 14 flush. The wedge is likewise provided with openings 21 for the passage of the cooling air downward into the empty spaces 8 between the storage cells 5. The dimensions of the openings 21 can be the same of different. Insulating material is arranged between the upper and the lower boundary surface of the wedge, the openings 21 being recessed.

The openings 21 are shown here as round holes but these openings may be given a different shape. The desired cooling air distribution can also be achieved if this wedge-shaped plate 20 is arranged between the lower end of the storage cells 5 and the output opening 17.

In each of the FIGS. 7, 8 and 9, an opening 21 of the distributor 20 is shown. These embodiments show the openings 21 provided with additional guide elements 24, 25 and 26. The guide elements 24, 25 and 26 serve to target conduction of the cooling air into the empty spaces 8 between the storage cells 5. In the embodiment shown in FIG. 7, the opening is provided with a flange 24 on the underside of the distributor 20. This has the effect that the cooling air flowing through the opening 21 gets completely into the empty space 8 (not shown here) and does not flow along the underside of the distributor 20.

In FIG. 8, the opening of a distributor 20 which is likewise designed as a plate is shown. The opening 21 is provided on the top side of the distributor 20 with a deflection element 25 which is arranged in part of the area. It is designed in the form of half-shells and is arranged behind the opening 21 as seen in the direction of the flow of the cooling air. The cooling air which flows along the top side of the distributor 20 is conducted into the opening 21 by the deflection element 25. With the use of the deflection element 25, with a predetermined flow velocity of the cooling air, a very definite amount of air, depending on the flow velocity of the cooling air, is conducted into the opening 21.

The opening 21 shown in FIG. 9 has a guide element 26 which is arranged on the underside of the distributor 20. It is designed as a nozzle. The guide element 26 is designed so that it protrudes into the empty space 8 (not shown) underneath. Through appropriate choice of the nozzle opening, the amount of cooling air can be determined which is to be fed into the empty space 8. On the other hand, the flow velocity of the cooling medium within the respective empty space 8 can be determined by means of the nozzle.

The invention is not limited only to the embodiments of distributors and openings shown in FIGS. 1–9, but the invention rather comprises any high-temperature storage batteries, in which the distribution of the cooling air is carried out with the aid of at least one distributor.

The foregoing is a description corresponding, in substance, to German application P No. 32 47 969.7, dated Dec. 24, 1982, international priority of which is being claimed for the instant application, and which is hereby made part of this application. Any material discrepancies between the foregoing specification and the specification of the aforementioned corresponding German application are to be resolved in favor of the latter.

There are claimed:

1. High-temperature storage battery comprising a double-walled housing with insulating material between the two walls of the housing, at least one module disposed in the interior of the housing containing a plurality of storage cells with empty spaces between the storage cells, at least one distributor in the module for distributing a fluid cooling medium to the storage cells in the module, a feedline connected to the fluid cooling medium for the introduction of the cooling medium to the storage cells, said distributor arranged between the feedline of the cooling medium in the module and the upper ends of the storage cells, formed of a continuous plate provided with openings arranged above the empty spaces between the storage cells.

2. High-temperature storage battery comprising a double-walled housing with insulating material between the two walls of the housing, at least one module disposed in the interior of the housing containing a plurality of storage cells with empty spaces between the storage cells, at least one distributor in the module for distributing a fluid cooling medium to the storage cells in the module, a feedline connected to the fluid cooling medium for the introduction of the cooling medium to the storage cells, said distributor arranged between the feedline of the cooling medium in the module and the upper ends of the storage cells, formed by two plate sections which do not cover the region in the center above the storage cells.

3. High-temperature storage battery comprising a double-walled housing with insulating material between the two walls of the housing, at least one module disposed in the interior of the housing containing a plurality of storage cells with empty spaces between the storage cells, at least one distributor in the module for distributing a fluid cooling medium to the storage cells in the module, a feedline connected to the fluid cooling medium for the introduction of the cooling medium to the storage cells, said distributor arranged between the feedline of the cooling medium in the module and the upper ends of the storage cells, formed of a plate in a wedge-shaped design and provided with openings arranged above the empty spaces between the storage cells.

4. High-temperature storage battery comprising a double-walled housing with insulating material between the two walls of the housing, at least one module disposed in the interior of the housing containing a plurality of storage cells with empty spaces between the storage cells, at least one distributor in the module for distributing a fluid cooling medium to the storage cells in the module, a feedline connected to the fluid cooling medium for the introduction of the cooling medium to the storage cells, said distributor arranged between the feedline of the cooling medium in the module and the lower ends of the storage cells, formed of a continuous plate provided with openings arranged under the empty spaces between the storage cells.

5. High-temperature storage battery according to claim 1, including a line through which the cooling medium enters, extending from the exterior to the interior of the double-walled housing to the upper end of a side of the module.

6. High-temperature storage battery according to claim 2, including a line through which the cooling medium enters, extending from the exterior of the interior of the double-walled housing to the upper end of a side of the module.

7. High-temperature storage battery according to claim 3, including a line through which the cooling medium enters, extending from the exterior to the interior of the double-walled housing to the upper end of a side of the module.

8. High-temperature storage battery according to claim 4, including a line through which the cooling medium enters, extending from the exterior to the interior of the double-walled housing to the upper end of a side of the module.

9. High-temperature storage battery according to claim 1, wherein the storage cells are arranged in the module in rows with an empty space which extends from the upper to the lower end of the storage cells between every four adjacent storage cells.

10. High-temperature storage battery according to claim 2, wherein the storage cells are arranged in the module in rows with an empty space which extends from the upper to the lower end of the storage cells between every four adjacent storage cells.

11. High-temperature storage battery according to claim 3, wherein the storage cells are arranged in the module in rows with an empty space which extends from the upper to the lower end of the storage cells between every four adjacent storage cells.

12. High-temperature storage battery according to claim 4, wherein the storage cells are arranged in the module in rows with an empty space which extends from the upper to the lower end of the storage cells between every four adjacent storage cells.

13. High-temperature storage battery according to claim 5, wherein the storage cells are arranged in the module in rows with an empty space which extends from the upper to the lower end of the storage cells between every four adjacent storage cells.

* * * * *